United States Patent [19]
Hjertberg et al.

[11] Patent Number: 4,706,508
[45] Date of Patent: Nov. 17, 1987

[54] BICYCLE SPOKE TENSIOMETER

[75] Inventors: Eric A. Hjertberg; Jon A. Hjertberg, both of Palo Alto, Calif.

[73] Assignee: Wheelsmith, Inc., Palo Alto, Calif.

[21] Appl. No.: 796,418

[22] Filed: Nov. 8, 1985

[51] Int. Cl.⁴ .............................................. G01L 5/06
[52] U.S. Cl. .................................................. 73/862.47
[58] Field of Search ........... 73/862.45, 862.46, 862.47, 73/862.48

[56] References Cited
U.S. PATENT DOCUMENTS 2,182,267 12/1939 Scusa ................................. 73/862.47
4,362,062 12/1982 Peterson ........................... 73/862.47

Primary Examiner—Charles A. Ruehl
Attorney, Agent, or Firm—William Green & Associates

[57] ABSTRACT

A tool for determining bicycle spoke tension consisting of two identical members pivoting in a scissors-like manner upon a screw retained sleeve. The two members are maintained at rest in a juxtaposed position by a spring in the center of the tool. The two members are forced apart and then permitted to close over a spoke. The tool not only grips the spoke, but it also deflects the spoke. A vernier scale is affixed to the tool which allows measuring spoke tension as a function of the amount of deflection.

7 Claims, 4 Drawing Figures

U.S. Patent  Nov. 17, 1987  4,706,508
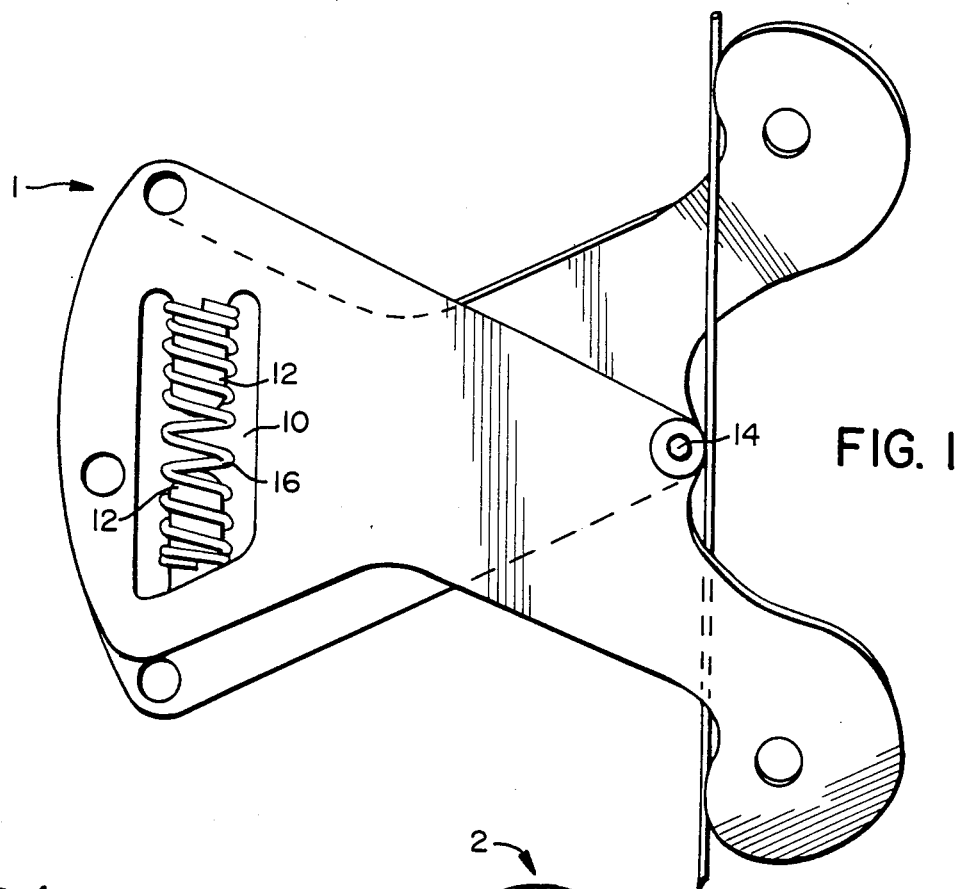
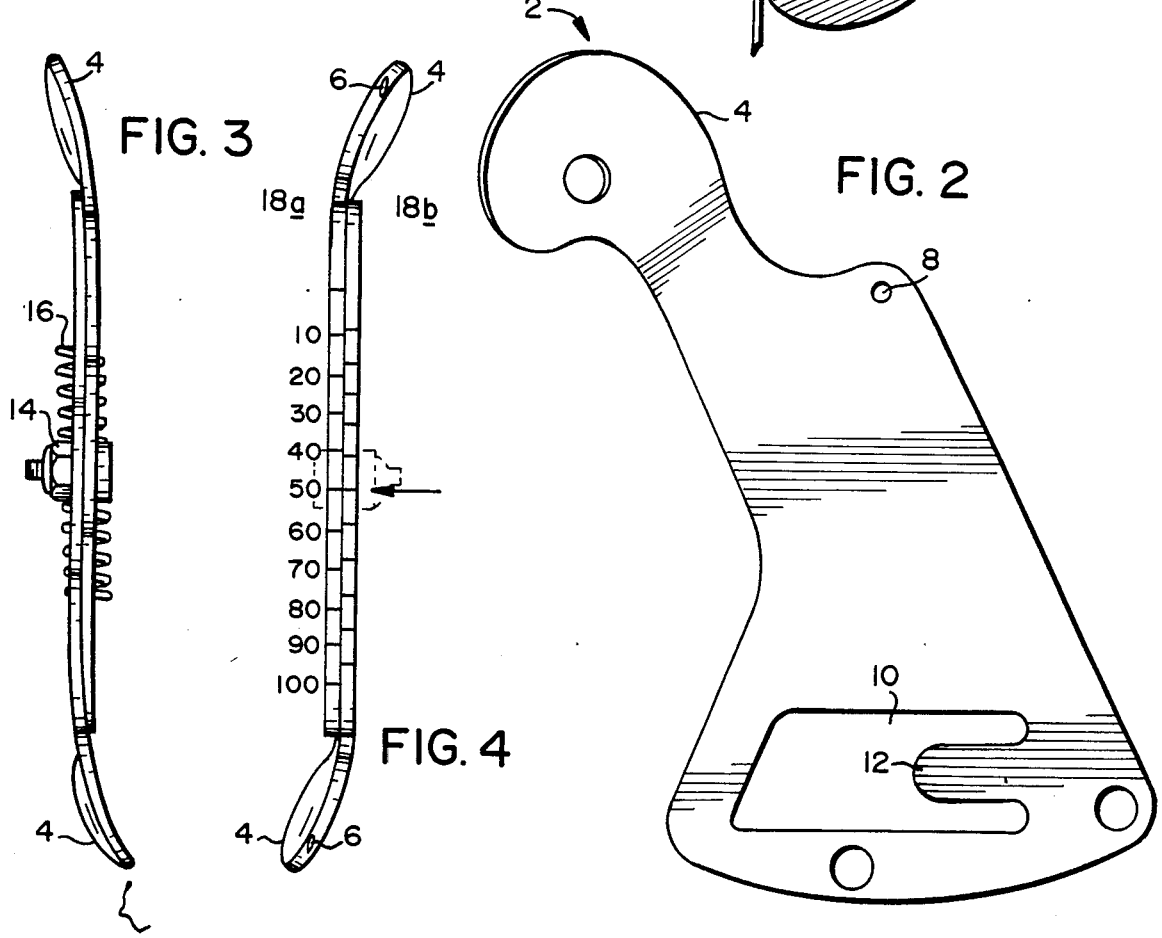

BICYCLE SPOKE TENSIOMETER

BACKGROUND OF THE INVENTION

1. Field of the Invention

This invention relates generally to a tensiometer and specifically to a tensiometer for bicycle spokes.

2. Description of the Prior Art

Builders and users of bicycle wheels depend upon adequate and uniform spoke tension to fulfill their design and performance objectives. Spoke tension has been traditionally measured subjectively. These subjective judgments are made by "feel" through touching or squeezing the spokes to judge their "stiffness", or by "ear" through plucking the spokes and judging or comparing the tone emitted by the plucked spoke. These methods involve substantial error, sometimes in excess of 50%.

Cable tensiometers are known wherein a cable to be tested is supported upon a pair of support members and deflected in a manner to permit a tension measurement.

SUMMARY OF THE INVENTION

The principal object of this invention is to provide a spoke tensiometer which is easy to use, durable, inexpensive, and effective over the full range of tensions useful for bicycle spokes including modern lightweight wheels which employ higher spoke tensions than traditional wheels.

Another object of this invention is to provide a tensiometer which is simple and easy to manufacture. Yet another object of this invention is to provide a spoke tensiometer that is easily calibrated and recalibrated.

This invention meets the above-stated objects and provides a spoke tensiometer with other advantages when compared to existing devices in the following manner. The device consists of two identical halves which are positioned facing each other and are connected by a screw retained sleeve which acts as a pivot. Each half contains a spring finger which opposes the other spring finger when the halves are positioned facing each other. A spring of known tension is positioned with one end over the spring finger of one half and the other end over the spring finger of the other half. This creates a "spring-loaded" scissor. Each half also has a portion which is slightly bent and notched in a manner that allows the device to grip a spoke. The device may then be used to determine spoke tension by observing the lateral displacement of halves 2, resulting from the deflection of the spoke caused by the constant spring pressure exerted midway between the two fixed points defined by the contact with the spoke of each half of the device. The deflection is proportional to spoke tension for any given gauge of wire. A vernier scale is provided upon the device and is used to measure the deflection.

BRIEF DESCRIPTION OF THE DRAWINGS

FIG. 1 is a front elevation of the device.

FIG. 2 is a front elevation of one of the identical halves which are joined to form the device.

FIG. 3 is an end view of the device from the top end.

FIG. 4 is an end view of the device from the bottom end.

DESCRIPTION OF THE PREFERRED EMBODIMENTS

Referring more particularly to FIGS. 1 and 2, a device designated generally as 1 is shown and a device half designated generally as 2 is shown. For purposes of illustration the device half 2 shall be assumed to have an inner face and an outer face. Half 2 which acts as a support plate, is provided with a gripping tab 4 which is a portion of half 2 which has been bent approximately 15 degrees in the direction of its inner face. Gripping tabs 4 are provided with small locating notches 6 at the portion of the gripping tab which will contact the spoke as described later. Pivot hole 8 is provided in the lobe of half 2 at a point below tab 4. Near the bottom of half 2 spring slot 10 having spring finger 12 extending into the slot parallel with half 2 is provided.

As shown in FIG. 1, a pair of halves as shown in FIG. 2 are positioned opposingly with their inner faces next to each other. Pivot means 14 connects the pair of halves through their respective pivot holes 8. Spring 16 is positioned within spring slots 10 over the respective spring fingers 12.

Referring to FIG. 4 separate scales 18(a) and 18(b) are provided on the bottom of each half 2 and are positioned so that relative movement of the two halves may be measured upon the scale.

In operation the device is squeezed to slightly compress spring 16 and a spoke is positioned at locating notches 6 of gripping tabs 4 and below the lobes of halves 2. When the device is released gripping tabs 4 both grip the spoke and deflect it. Vernier scales 18(a) and 18(b) are read to determine the degree of deflection and the spoke tension is calculated from the degree of deflection. The scale is originally calibrated upon a spoke of known tension. In the illustrated embodiment, the scale has no "zero" reading, but instead indicates the operating range and reads in arbitrary units. The scale can be used to refer to a chart of tensions for different spoke gauges.

In this embodiment, the tool is able to distinguish tension via deflection in steel wire of 1.5 to 2.5 mm diameter within an operating range of 50 to 200 kg of tension with an accuracy of plus or minus 5%. The device is temperature insensitive for all normal atmospheric conditions.

The initial device has been fabricated in aluminum approximately 4 mm thick. The spring may be any length as long as deflection is achieved and it fits within the slot provided. Although we have suggested a form of vernier scale, the scale can be printed in tension units with different scales for different gauges and proportioned appropriately for different combinations of springs and pivoting half sizes.

It is obvious that the device of this invention may be used with modifications or selections of sizes and materials to measure tension for other materials including, but not limited to woven wires or cords, tennis raquet strings, and control cables.

The device has only two identical moving parts, exclusive of the spring and thus achieves the objects of simplicity, ease of use, durability, ease of manufacture and accuracy in a manner not heretofore available.

The specific description set forth herein may be departed from without departing from the scope of this invention as set forth herein and within the appended claims.

We claim:

1. A tensiometer device comprising, in combination, a pair of support plates facing each other, each support plate having a lower portion and an upper portion provided with a gripping tab offset horizontally from the vertical centerline of said plate and bent inwardly toward the other plate, pivot means connecting said plates to permit scissors-like movement of the upper and lower portions of said plates about said pivot means, spring means positioned to urge the lower portion of said support plates to pivot away from each other.

2. A device according to claim 1 in which an indicating scale is provided upon said support plates to indicate relative movement of said support plates.

3. A device according to claim 1 in which each of said support plates includes spring attachment means consisting of a slot within the lower portion of said support plate having a spring finger extending within the plane of said support plate horizontally within said slot toward the side of said support plate upon which said gripping tab is located.

4. A device according to claim 3 wherein said spring means is a coil spring and the opposite ends of said coil spring are positioned over the spring fingers of each support plate.

5. A device according to claim 1 in which said gripping tabs have a notch positioned upon the bottom of said gripping tab to facilitate gripping.

6. A device according to claim 1 wherein said pivot means is a screw retained sleeve.

7. A device according to claim 1 wherein said support plates are identical.

* * * * *